June 20, 1961  L. SCHMID  2,989,347
AUXILIARY VEHICLE SUPPORTING DEVICE
Filed April 10, 1959
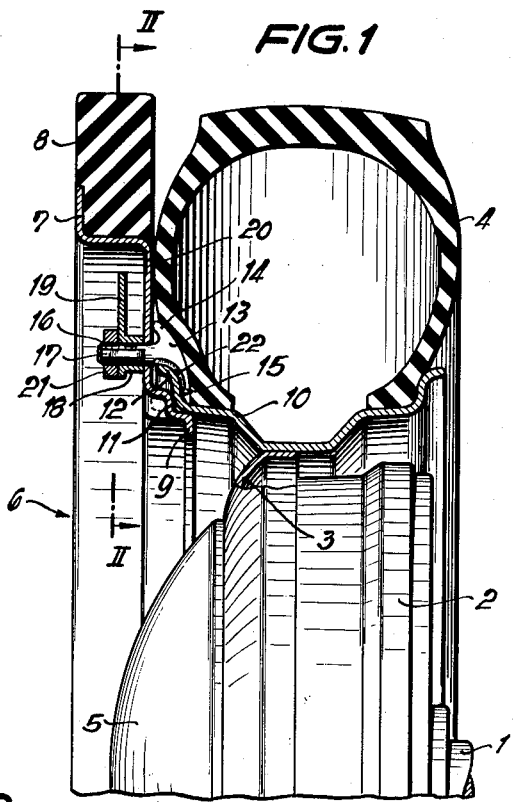
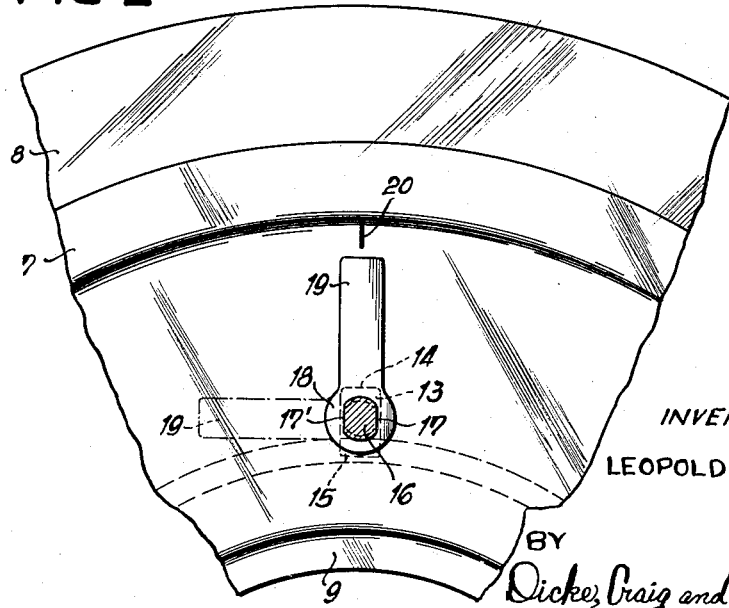
INVENTOR
LEOPOLD SCHMID
BY
Dickey, Craig and Freudenberg
ATTORNEYS //
United States Patent Office 2,989,347
Patented June 20, 1961

2,989,347
AUXILIARY VEHICLE SUPPORTING DEVICE
Leopold Schmid, Stuttgart, Wurttemberg, Germany, assignor to Dr. Ing. h.c. F. Porsche K.G., Stuttgart-Zuffenhausen, Germany
Filed Apr. 10, 1959, Ser. No. 805,570
Claims priority, application Germany Apr. 26, 1958
4 Claims. (Cl. 301—39)

The present invention relates to an auxiliary arrangement and installation for supporting the vehicle axle by means of an auxiliary wheel in case of tire damages or tire blow-outs of motor vehicles, which includes a rubber-sprung wheel disk member which is clamped without wheel-change against the rim of the damaged vehicle wheel.

In the constructions of this type known in the prior art, the support and securing of the auxiliary wheel disk member usually takes place by means of the center portion or securing flange thereof projecting outside the plane of the resilient or elastic runner ring member secured to the circumference of the auxiliary wheel which is clamped with the aid of the available wheel nut or bolt members against the rim of the damaged wheel. This type of securing, therefore, requires, together with a relatively large expenditure in material, a relatively large depth in the pressed-out center portion of the wheel disk member so that the unsprung mass of the wheel incurs an undesirable increase by such an additional wheel disk member.

Furthermore, the support of the auxiliary wheel by means of the wheel nut or bolt members does not provide the required safe support thereof by reason of the location thereof remote from the place or point where the forces act against the auxiliary wheel or support member so that an increased attention on the part of the driver is necessary even with relatively moderate speeds once the prior art auxiliary wheel support is installed.

According to the present invention, these disadvantages are avoided by the fact that the securing of the auxiliary wheel disk member takes place by means of several essentially bow-shaped clamping members evenly distributed along the periphery of the wheel rim which are clamped between the wheel rim flange of the damaged vehicle wheel and the auxiliary wheel disk member. As a result of such an arrangement in accordance with the present invention, it is possible to get by, in case of damage to the wheel, with a considerably smaller and lighter wheel disk member which does not significantly increase the unsprung mass. Simultaneously therewith, the securing of the auxiliary wheel disk member in accordance with the present invention takes place in proximity and essentially in the plane of the auxiliary elastic annular runner member so that the forces and stresses may be absorbed more readily and, consequently, may be safely controlled thereby. The auxiliary wheel disk member in accordance with the present invention is provided with a centering, stepped portion preferably within the region of the bow-shaped clamping member and conforming to the contours of the wheel rim flange. A good seating of the auxiliary wheel disk member results from such a construction and additionally the significant advantage is obtained by the use of the stepped portion that a space remains between the auxiliary disk member and the wheel rim flange for the accommodation of balancing weights which may be used to balance the wheel. The clamping member in accordance with the present invention is thereby form-lockingly connected with an adjusting sleeve which carries form-lockingly a handle. By the use of such an arrangement, a ready and facilitated assembly and mounting of the auxiliary wheel disk member is made possible. Moreover, any possible damage to the wheel rim flange at the place where the clamping occurs is avoided with certainty if the tongue portion of the clamping member clamped against the wheel rim flange is provided with a suitable coating of relatively low hardness.

Accordingly, it is an object of the present invention to provide an auxiliary wheel or support member for the wheel of a motor vehicle which may be readily attached to the wheel in question in case of damage to the tire thereof.

Another object of the present invention resides in the provision of an auxiliary support for the axle of a motor vehicle which does not materially increase the unsprung weight of the corresponding wheel and in which the forces to be transmitted may be readily absorbed in an appropriate manner.

Another object of the present invention resides in the provision of an auxiliary supporting device provided with an elastic outer support surface which reduces the amount of material necessitated in the construction thereof and which may be so attached to the wheel of the vehicle as to be secured to the damaged wheel in close proximity to the place where the transmission or absorption of forces takes place.

A further object of the present invention is the provision of a securing and mounting arrangement for an auxiliary support device of a motor vehicle wheel which is simple, relatively inexpensive and which permits ready assembly and mounting of the auxiliary support.

These and other objects, features and advantages of the present invention will become more obvious from the following description when taken in connection with the accompanying drawing, which shows, for purposes of illustration only, one embodiment in accordance with the present invention, and wherein:

FIGURE 1 is a partial cross-sectional view through one-half of the auxiliary wheel support in accordance with the present invention including an auxiliary wheel disk member clamped against the vehicle wheel and FIGURE 2 is an enlarged cross-sectional view taken along line II—II of Figure 1.

Referring now to the drawing, wherein like reference numerals are used throughout the two views thereof to designate like parts, reference numeral 1 designates the spindle or axle member of any suitable known construction for the front axle of a motor vehicle which carries, in a manner known per se, a brake drum 2 to which the wheel rim 3 of a vehicle wheel including a tire 4 of any suitable construction, for instance, a tubeless tire is secured. The vehicle wheel is covered laterally toward the outside of the vehicle by means of a wheel cover 5 which may be of any decorative arrangement and construction. In order to maintain the operativeness of the vehicle in case of damage to the vehicle wheel or tire 4, a disk-shaped auxiliary wheel generally designated by reference numeral 6 is provided which consists of an auxiliary annular disk member 7 carrying an elastic annular runner member 8 made, for example, of solid rubber. The runner member 8 is rigidly connected with the annular disk member 7 on two sides thereof in any suitable manner, for example, by bonding, vulcanizing or the like. The annular disk 7 is provided with a hub portion 9 which abuts against the shoulder 10 of the wheel rim 3. The auxiliary wheel disk member 7 is thereby positioned and centered with respect to the vehicle wheel by means of a centering stepped portion 11 which is conformed to the contours of the wheel rim flange 12 provided at the wheel rim 3. The centering stepped portion 11 is provided exclusively within the region of the several securing means, for instance, four in number and evenly distributed along the circumference of the wheel disk member 7 of which one securing means is shown in FIGURE 1 of the drawing. Each of the four securing means is formed by a bow-shaped clamping member 13 which is provided with two tongue portions 14 and 15. The tongue portion 14 thereof thereby rests against the auxiliary wheel disk member 7, whereas the tongue portion 15 thereof is conformed to the configuration of the wheel rim flange 12. The clamping member 13 is provided at the outer prolongation thereof with a threaded pin 16 provided on mutually opposite sides thereof with flattened portions 17 and 17' (FIGURE 2). The flattened portions 17 and 17' serve for purposes of the form-locking connection of the bow-shaped clamping member 13 with an adjusting sleeve 18 (FIGURE 2) surrounding the pin member 16. The adjusting sleeve 18 carries a handle 19 for purposes of rotating the clamping member 13 about the axis of rotation thereof.

*Operation*

The installation and operation of the auxiliary support in accordance with the present invention is as follows:

If the air escapes from the damaged wheel or tire 4, for instance, if the tire 4 thereof is punctured so that the corresponding vehicle wheel would normally be of no use for purposes of driving the vehicle, then the vehicle axle member 1 is lifted in any suitable manner, for example, by means of a jack and the auxiliary wheel 6 ordinarily stored at any suitable place within the vehicle is clamped against the wheel rim 3 without taking off the damaged wheel 4. For that purpose, the bow-shaped clamping member 13 are appropriately oriented or aligned with the aid of the sleeve 18 and are subsequently moved or guided behind the wheel rim flange 12 by pivoting the handle 19 up to a marker in the form of a notch 20 provided at the wheel rim. The clamping members 13 are thereupon securely tightened by means of nut members 21 whereupon the vehicle is again ready to operate.

The disassembly of the auxiliary wheel takes place in the same manner in reverse sequence.

Since the wheel flange 12 normally also serves as sealing surface with tubeless tires, it is appropriate in order to preclude deformation thereof to provide the tongue portion 15 which normally abuts thereagainst with a coating 22 of synthetic material having a relatively tough though elastic characteristic.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein, but intend to cover all such changes and modifications as are encompassed by the scope of the appended claims.

What I claim is:

1. An auxiliary wheel means for supporting the axle member of the vehicle in case of damage to the wheel of a motor vehicle having at least one wheel mounted on an axle member, said wheel comprising a rim means including a shaped flange portion having an outer surface and a tire mounted on said rim means, comprising auxiliary support means so constructed and arranged as to be easily and quickly clamped to said rim means when said wheel is damaged and including an annular disk member, an elastic annular runner member attached to the outer periphery of said disk member, and a centering means essentially conforming to the contour of the outer surface of said shaped flange portion of said rim means, said centering means fittingly abutting the outer surface of said flange portion about the periphery thereof when said auxiliary wheel is clamped to said rim means, and a plurality of clamping means adapted to easily and readily secure said auxiliary wheel to said wheel when the latter is damaged, said clamping means being evenly distributed about the circumference of the auxiliary support means and being so constructed and arranged as to secure the auxiliary support means to said rim means in a plane in close proximity with the plane of the elastic annular runner member, each of said clamping means including a clamping member extending between said flange portion and said tire and rigidly secured to said disk member to thereby rigidly secure the disk member to the wheel.

2. An auxiliary wheel means for supporting the axle member of the vehicle in case of damage to the wheel of a motor vehicle having at least one wheel mounted on an axle member, said wheel comprising a rim means including a shaped flange portion having an inner surface and a tire mounted on said rim means, comprising auxiliary support means so constructed and arranged as to be clamped to said rim means and including an annular disk member, an elastic annular runner member attached to said disk member, and a centering portion essentially conforming to the contour of said shaped flange portion of said rim means, said centering portion abutting said shaped flange portion about the periphery thereof, and a plurality of clamping means evenly distributed about the circumference of the auxiliary support means, each of said clamping means being so constructed and arranged as to secure the auxiliary support means to said rim means in a plane in close proximity with the plane of the elastic annular runner member and each of said clamping means including a bow-shaped member having two tongue portions, one of said tongue portions resting against said disk member when the auxiliary support is attached to the wheel, and the other of said tongue portions essentially conforming to the contour of the inner surface of said shaped flange portion of said rim means and resting thereagainst when the auxiliary support means is attached to the wheel to thereby clamp said auxiliary wheel to said rim means, said other of the tongue portions having a coating of relatively low hardness to protect said shaped flange portion and said tire within the region of said clamping means.

3. An auxiliary wheel means for supporting the axle member of the vehicle in case of damage to the wheel of a motor vehicle having at least one wheel mounted on an axle member, said wheel comprising a rim means including a stepped flange portion having inner and outer shaped faces and a tire mounted on said rim means, comprising auxiliary support means so constructed and arranged as to be clamped to said rim means and including an annular disk member, an elastic annular member attached to the outer rim of said disk member, and a stepped centering portion essentially conforming to the contour of the outer face of said stepped flange portion of said rim means, and a plurality of clamping means evenly distributed about the circumference of the disk member, each of said clamping means being so constructed and arranged as to secure the disk member to said rim means and including a bow-shaped member having two tongue portions, one of said tongue portions resting against said disk member when the auxiliary support means is attached to the wheel and the other of said tongue portions essentially conforming to the contour of the inner face of said stepped flange portion of said rim means and resting thereagainst when the auxiliary support means is attached to the wheel to thereby secure the auxiliary wheel to said rim means, said other of the tongue portions having a coating of relatively low hardness to protect said stepped portion within the region of said clamping means, a threaded end attached to said bow-shaped member extending through said disk member and having two flattened sides, and adjusting sleeve including a handle thereon surrounding said threaded end for movement therewith, and a nut member on said end tightly securing said bow-shaped member to said disk member and said handle to said bow-shaped member so that said handle and said bow-shaped member move together for clamping the auxiliary support means to the vehicle wheel.

4. An auxiliary wheel means for motor vehicles as defined in claim 3, wherein the annular disk member and the elastic annular runner member are located in a common, substantially vertical plane, and said stepped centering portion abuts the outer face of the stepped flange portion of said rim means about the periphery thereof, and wherein said clamping means joins the auxiliary support means to the vehicle wheel rim means in a plane in close proximity with the plane of the elastic annular runner member.

References Cited in the file of this patent

UNITED STATES PATENTS

| | | |
|---|---|---|
| 626,989 | Downes | June 13, 1899 |
| 1,858,088 | Howard | May 10, 1932 |
| 1,918,694 | Gerben | July 18, 1933 |
| 2,019,120 | Cunningham | Oct. 29, 1935 |
| 2,179,170 | Bahensky | Nov. 7, 1939 |
| 2,272,145 | Anderson | Feb. 3, 1942 |
| 2,454,923 | Howell | Nov. 30, 1948 |
| 2,670,994 | Parrott | Mar. 2, 1954 |

FOREIGN PATENTS

| | | |
|---|---|---|
| 235,389 | Great Britain | June 18, 1925 |